United States Patent [19]

Mulchandani et al.

[11] Patent Number: 5,687,378

[45] Date of Patent: Nov. 11, 1997

[54] METHOD AND APPARATUS FOR DYNAMICALLY RECONFIGURING A PARSER

[75] Inventors: Deepak Mulchandani; Rand Gray, both of Austin, Tex.

[73] Assignee: Motorola, Inc., Schaumburg, Ill.

[21] Appl. No.: 485,330

[22] Filed: Jun. 7, 1995

[51] Int. Cl.⁶ .................................................. G06F 9/45
[52] U.S. Cl. ............................................................ 395/708
[58] Field of Search ............................ 395/708, 500, 395/705, 653

[56] References Cited

U.S. PATENT DOCUMENTS

| | | | |
|---|---|---|---|
| 4,686,623 | 8/1987 | Wallace | 364/300 |
| 5,276,880 | 1/1994 | Platoff et al. | 395/700 |

OTHER PUBLICATIONS

"Compilers: Principles, Techniques and Tools", Aho et al., Addison-Wesley, 1988, pp. 215–247.

Primary Examiner—Alvin E. Oberley
Assistant Examiner—Kakali Chaki
Attorney, Agent, or Firm—Bruce E. Hayden

[57] ABSTRACT

A parser is dynamically reconfigured. Parse Control Records are read into memory. They are inserted into corresponding Parse Table Entries in a Parse Table in memory identified by a Parse Table Entry Identifier in each Parse Control Record. Each of the Parse Table Entries corresponds to a single command, and includes an ordered series of allowable parse states for that command. After a string of text has been tokenized into an ordered sequence of tokens, the ordered sequence of tokens is evaluated pursuant to the allowable parse states in the Parse Table Entries to determine whether the Text String has a valid syntax.

22 Claims, 4 Drawing Sheets

METHOD AND APPARATUS FOR DYNAMICALLY RECONFIGURING A PARSER

CROSS REFERENCE TO RELATED APPLICATION

This application is related to our copending patent application entitled METHOD AND APPARATUS FOR SYNCHRONIZING DATA IN A HOST MEMORY WITH DATA IN A TARGET MCU MEMORY, filed of even date herewith and assigned to the assignee hereof.

This application is related to our copending patent application entitled METHOD AND APPARATUS FOR AUTOMATICALLY RECONFIGURING A HOST DEBUGGER BASED ON A TARGET MCU IDENTITY, filed of even date herewith and assigned to the assignee hereof.

This application is related to our copending patent application entitled METHOD AND APPARATUS FOR RESTORING A TARGET MCU DEBUG SESSION TO A PRIOR STATE, filed of even date herewith and assigned to the assignee hereof.

1. Field of the Invention

The present invention generally relates to parsers, and more specifically to computer based dynamically reconfigurable parsers.

2. Background of the Invention

The way that users interact with software systems is determined by the language utilized by the software system. This is applicable for command languages, for assembler languages, and for any other system which has an input format for data.

There is a significant cost involved in teaching users new languages. This can be minimized by allowing users to use languages they are already familiar with. Software portability can be significantly enhanced if language parsers can be made flexible enough that they can be rapidly and easily reconfigured.

Traditionally command language and assembler parsers have been hard coded. This usually means that they have to be recompiled and relinked before they can accept different syntax. This makes these parsers unusable in a dynamic environment where the data is often reconfigured or the data could have multiple formats.

Every time a new version of a software system is released, enhancements and new features usually mean some changes to the command language. Elementary features such as "command aliasing" and "command renaming" are usually provided by the software for them to customize a command name to be something more intuitive. However, that is usually not enough to make a user feel comfortable with the software.

Another example is the case of assemblers, where different assemblers support different syntax formats for assembly language and assembler directives. This usually means that everytime a user wishes to migrate his applications between assemblers he must manually go through and fix all the differences by himself.

There are a number of dynamic languages commercially available that overcome at least to some extent the requirement for recompiling and/or relinking. One of these dynamic languages is TCL developed at U.C. Berkley by John Ousterhout. It is an interpreted language that provides users with a complete command language to perform operations. It has extensive features supporting graphics, process control, and string manipulation. However, TCL programs cannot be easily modified to dynamically change the language syntax. Also TCL provides limited command customization by use of an interpreter. It is thus very slow.

The Python language has many of the same advantages as TCL. It is an object oriented interpreted language. Python also has the same limitation as TCL, wherein Python programs cannot quickly and easily be modified to dynamically change language syntax.

The PERL language was developed by Larry Wall of Netlabs, Inc. It combines the best features of AWK, SED, and UNIX shell programming. It can be linked with external C libraries. However, PERL scripts cannot be dynamically modified, making dynamic modification of language syntax extremely difficult.

TCL, Python, and PERL are very powerful programming languages which can be used in applications' development. However, because of their size and complexity, all are fairly slow. None of these three languages allows a user to rapidly reconfigure an input parser "on-the-fly".

SUMMARY OF THE INVENTION

In accordance with the invention, A parser is dynamically reconfigured. Parse Control Records are read into memory. They are inserted into corresponding Parse Table Entries in a Parse Table in memory identified by a Parse Table Entry Identifier in each Parse Control Record. Each of the Parse Table Entries corresponds to a single command, and includes an ordered series of allowable parse states for that command. After a string of text has been tokenized into an ordered sequence of tokens, the ordered sequence of tokens is evaluated pursuant to the allowable parse states in the Parse Table Entries to determine whether the Text String has a valid syntax.

These and other features, and advantages, will be more clearly understood from the following detailed description taken in conjunction with the accompanying drawings. It is important to point out that there may be other embodiments of the present invention which are not specifically illustrated.

DETAILED DESCRIPTION OF A PREFERRED EMBODIMENT

The method of Dynamic Parsing disclosed herein dynamically parses commands and assembler syntax. Dynamic Parsing can be tailored to be used in a wide variety of applications for data input and manipulation. It allows for rapid and easy reconfiguration of parsed syntax. This is most useful if the data that needs to be reconfigured is reconfigured often.

The invention described herein allows a software system to implement a general data input mechanism which can be configured after an application has been compiled, or needs to be configured by a user. This saves repeated regenerations of an application every time a feature changes, or the frustration users who need to re-learn a new command language everytime a new version of the software system is released.

Figure 1:
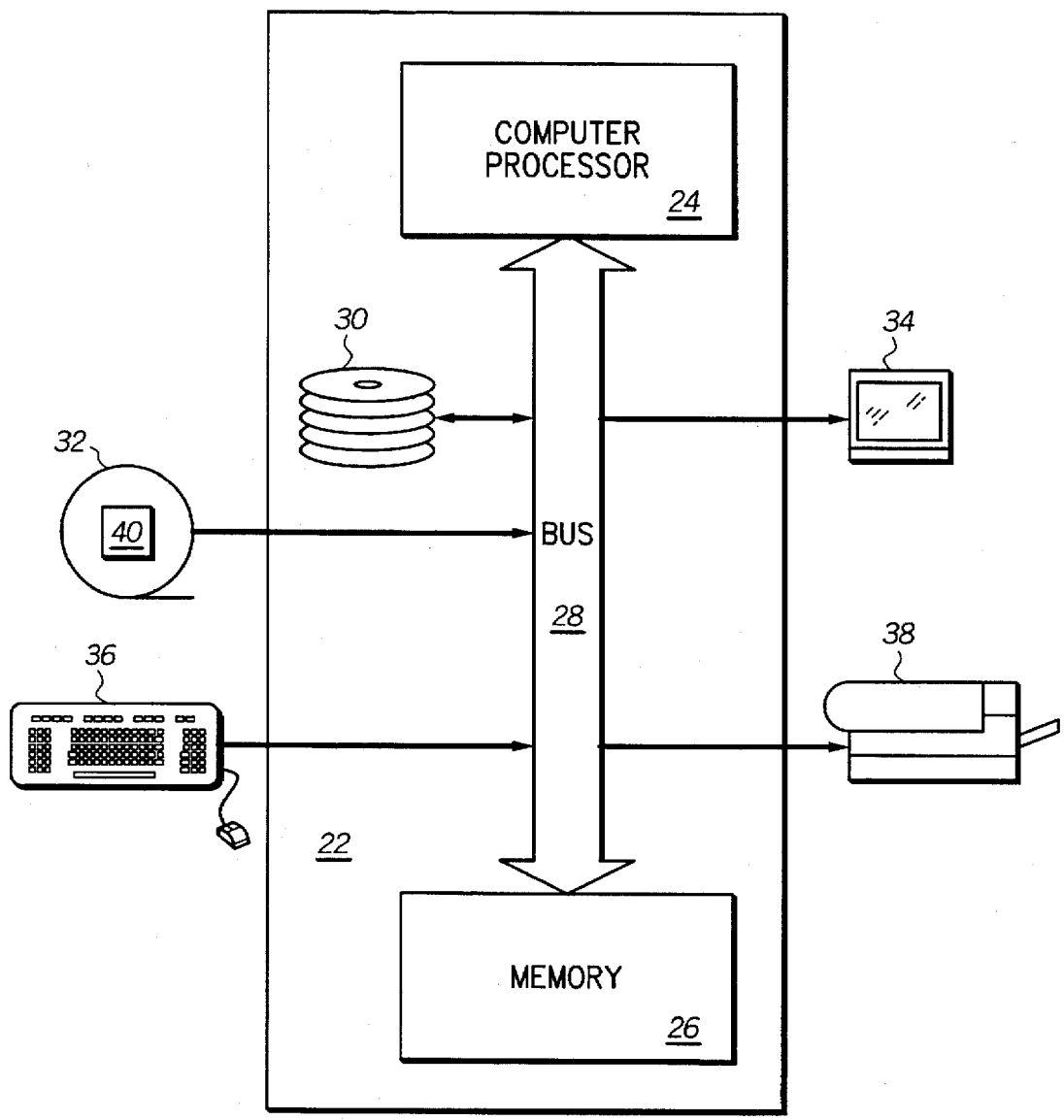
FIG. 1 is a system block diagram showing in accordance with the current invention the hardware components utilized in Dynamic Parsing.

FIG. 1 is a system block diagram showing the hardware components utilized in Dynamic Parsing. Dynamic Parsing operates as part of a computer program that can be executed on a general purpose Computer 22. The computer 22 has a Computer Processor 24 connected via a Bus 28 to Memory 26. Optionally also connected to the bus 28 are a Disk drive 30, External Memory 32, monitor 34, keyboard 36, and printer 38. A computer program containing Dynamic Parsing 40 can be loaded into the Computer 22 from the External Memory 32. Some examples of External Memory 32 are diskettes, tape, CD ROMs, and other computers.

Figure 2:
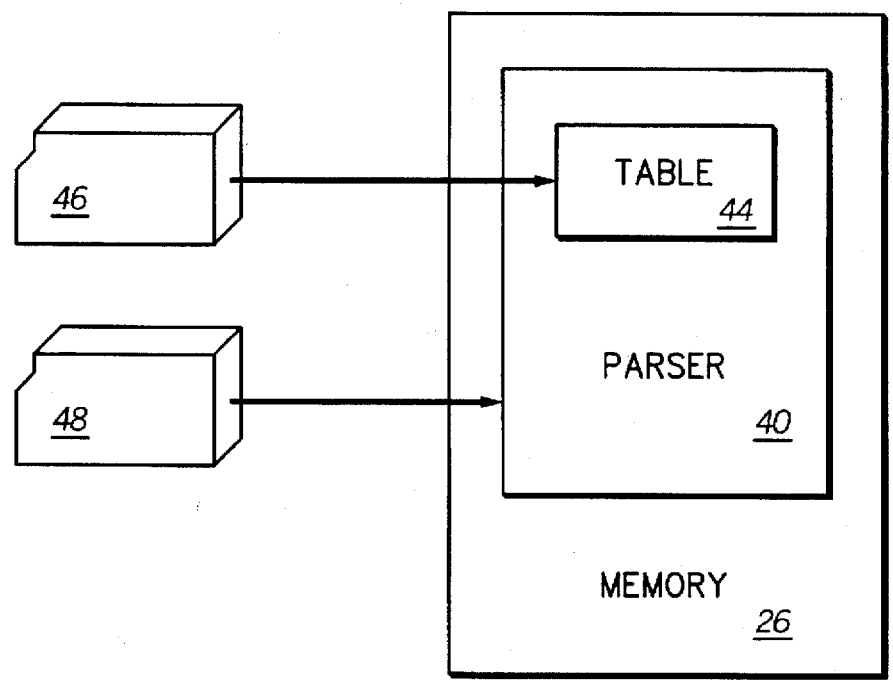
FIG. 2 is a system block diagram showing showing in accordance with the current invention how various components of the Dynamic Parsing interact.

FIG. 2 is a system block diagram showing how various components of the Dynamic Parsing interact. The Parser 40 usually comprises a plurality of interoperating software modules. It can be embedded within a larger software program, such as an assembler or debugger. In order to operate, the Parser 40 is loaded into Memory 26 and executed by the Computer Processor 24 (see FIG. 1). There are two primary inputs to the Parser 40: a set of Parse Rules 46, and the Parse Source language 48. Both the Parse Rules 46 and the Parse Source 48 often are input as files on disk 30. However, either may be input interactively at the keyboard 36. The Parser 40 reads the Parse Rules 46 into a Parse Table 44, again located in memory 26. The Parser 40 uses the Parse Rules 46 to parse the Parse Source 48.

Figure 3:
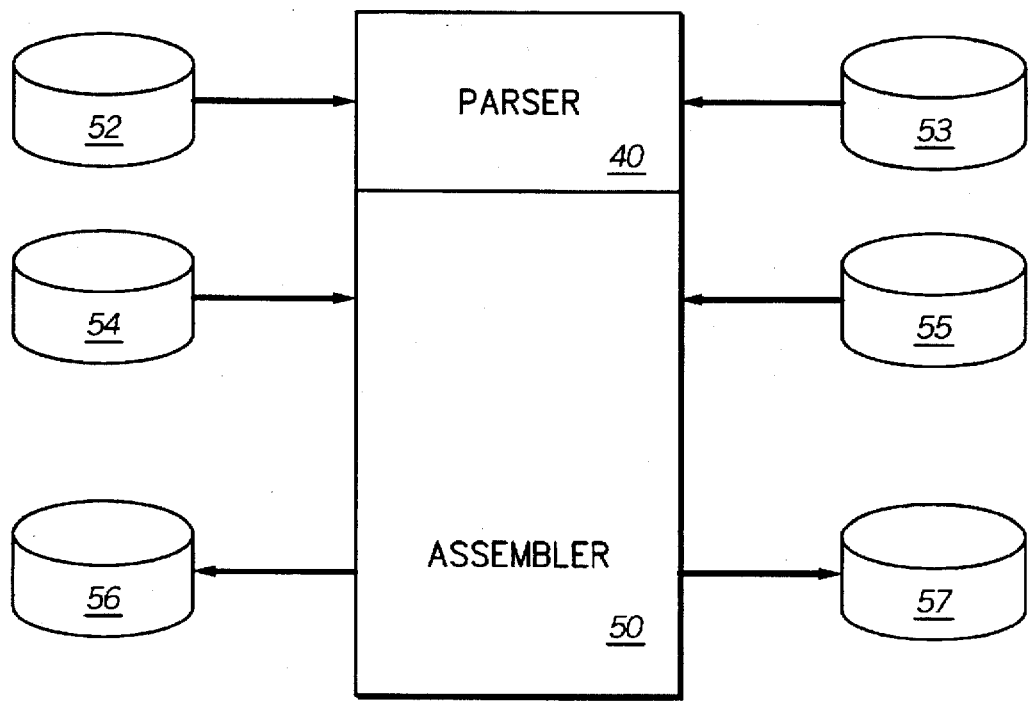
FIG. 3 is a block diagram showing showing in accordance with the current invention how a Parser embedded in an Assemblercan easily assemble code with differing syntax without requiring recompiling or relinking of the Assembler.

FIG. 3 is a block diagram showing how a Parser 40 embedded in an Assembler 50 can easily assemble code with differing syntax without requiring recompiling or relinking of the Assembler 50. Assembler source code files 54, 55 with two different syntaxes are shown. A first set of Parse Rules 52 is read into the Parse Table 44 (see FIG. 2) in the Parser 40 allowing assembly of assembler source files 54 encoded in a first assembler syntax, resulting in a first set of object code files 56. Likewise, a second set of Parse Rules 53 are utilized by the Parser 40 to allow parsing of assembler source files 55 encoded in a second assembler syntax, resulting in a second set of object code files 57.

The Appendix contains source code for four modules: lex.h, lex.c, parse.h, and parse.c utilized to implement Dynamic Parsing. The lex.c routine parses a line of text into tokens. The parse.c routine then applies the relevant rules previously read into the Parse Table 44 in Memory 26 to the tokens from the lex.c routine. The values in the Parse Table 44 are the integer representations of the states in the parse.h header file.

One example of implementing Dynamic Parsing utilizes a Parse Table 44 resulting from reading in the values in table T-1:

TABLE T-1

| CMD. | Idx | Cnt | 1 | 2 | 3 | 4 | 5 | 6 | 7 | 8 |
|---|---|---|---|---|---|---|---|---|---|---|
| ASM | 1 | 3 | 0 | 7 | 24 | | | | | |
| BAUD | 2 | 3 | 0 | 8 | 24 | | | | | |
| BR | 3 | 3 | 0 | 2 | 24 | | | | | |
| CF | 4 | 3 | 0 | 6 | 24 | | | | | |
| CHIPINFO | 5 | 2 | 0 | 24 | | | | | | |
| DASM | 6 | 3 | 0 | 7 | 24 | | | | | |
| DIFF | 7 | 4 | 0 | 6 | | 24 | | | | |
| EXIT | 8 | 3 | 0 | 22 | 24 | | | | | |
| GO | 9 | 2 | 0 | 24 | | | | | | |
| G | 10 | 2 | 0 | 24 | | | | | | |
| LF | 11 | 3 | 0 | 6 | 24 | | | | | |
| LOAD | 12 | 3 | 0 | 5 | 24 | | | | | |
| LT | 13 | 3 | 0 | 6 | 24 | | | | | |
| MD | 14 | 5 | 0 | 2 | 9 | 2 | 24 | | | |
| MM | 15 | 6 | 0 | 2 | 9 | 2 | 2 | 24 | | |
| NOBR | 16 | 2 | 0 | 24 | | | | | | |
| QUIT | 17 | 3 | 0 | 22 | 24 | | | | | |
| RD | 18 | 2 | 0 | 24 | | | | | | |
| RM | 19 | 8 | 0 | 1 | 3 | 2 | 24 | 4 | 23 | 2 |
| RESET | 20 | 2 | 0 | 24 | | | | | | |
| RESETGO | 21 | 2 | 0 | 24 | | | | | | |
| S | 22 | 2 | 0 | 24 | | | | | | |
| STEPFOR | 23 | 3 | 0 | 2 | 24 | | | | | |
| STEPTIL | 24 | 3 | 0 | 2 | 24 | | | | | |
| STOP | 25 | 2 | 0 | 24 | | | | | | |
| VAR | 26 | 3 | 0 | 6 | 24 | | | | | |
| VERSION | 27 | 2 | 0 | 24 | | | | | | |
| WAIT | 28 | 3 | 0 | 2 | 24 | | | | | |

Table T-2 demonstrates the parse rules for the "rm" command on line 19 of table T-1:

TABLE T-2

| Index | State | Description |
|---|---|---|
| 1 | 0 | match the command name |
| 2 | 1 | match a register name |
| 3 | 3 | match an optional "=" |
| 4 | 2 | match a hexadecimal value |
| 5 | 24 | match the end-of-string |
| 6 | 4 | match an optional "," |
| 7 | 23 | jump |
| 8 | 2 | jump destination (index = 2) |

Figure 4:
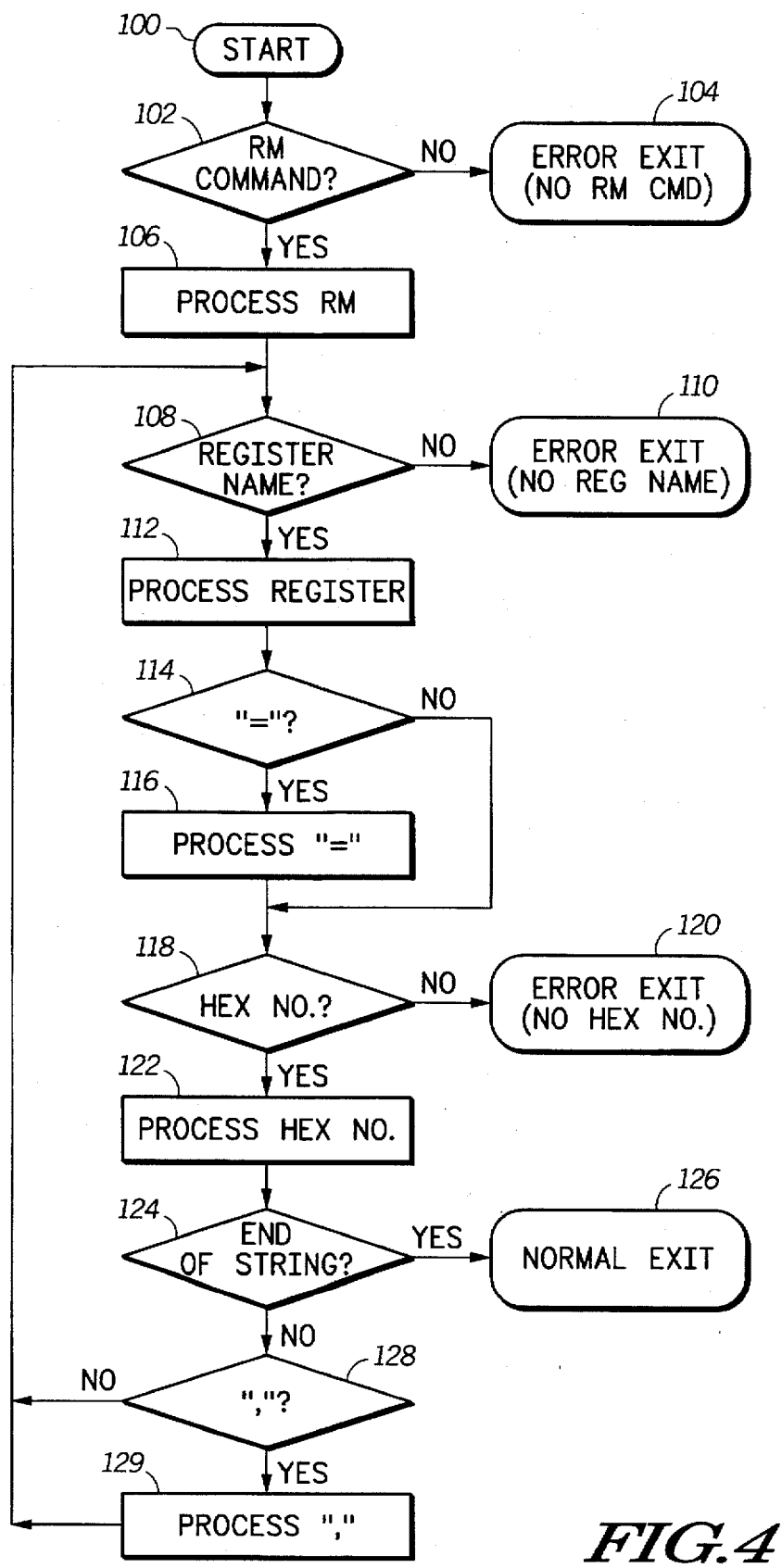
FIG. 4 is a flow chart showing showing in accordance with the current invention the parsing of the "rm" command from line 19 of Table T-1.

FIG. 4 is a flow chart showing parsing of the "rm" command from line 19 of Table T-1. The parse starts, step 100. A check is made for the "rm" command, step 102. This corresponds to line 1 of Table T-2. If there is no "rm" command, the parse error exits 104, ultimately to parse another command. Otherwise, the "rm" command processing is initialized, step 106. Next, the tokens are checked for a register name, step 108. This corresponds to the value 1 on line 2 of Table T-2. If no register name is found, step 108, the parse error exits, step 110. Otherwise, the register name is processed, step 112.

Next, a check is made for an optional equal sign ("="), step 114. This corresponds to the value 3 on line 3 of Table T-2. If the optional equal sign is found, it is processed, step 116. In either case, a check is then made for a hex number, step 118. This corresponds to value 2 on line 4 of Table T-2. If a number is not found, the parse error exits, step 120. Otherwise, the hex number is processed, step 122. A check is then made for and end-of-string token, step 124. This corresponds to value 24 on line 5 of Table T-2. If the end-of-string token is found, step 124, the parse exits normally, step 126.

If the end-of-string was not found, step 124, a check is made for an optional comma, step 128. This corresponds to the value 2 one line 6 of Table T-2. If the comma exists, it is processed, step 129. In either case, a jump is made back to the register name check, step 108. This corresponds to the jump command, which is value 23 on line 7 of Table T-2. The destination of the jump command is the value 2 on line 8 of Table T-2. The jump destination of 2 instructs the parser to jump back to the command on line 2 of Table T-2.

The definition of the "rm" command on line 19 of Table T-1 would thus allow commands of the format:

TABLE T-3

| Command | Meaning |
| --- | --- |
| rm pc = 10 | assign pc the value of 0 × 10 |
| rm pc 10 | assign pc the value of 0 × 10 |
| rm pc = 10 h = 20 | assign pc the value of 0 × 10, and h the value 0 × 20 |
| rm pc = 10, h = 20 | assign pc the value of 0 × 10, and h the value 0 × 20 |
| rm pc 10 h 20 | assign pc the value of 0 × 10, and h the value 0 × 20 |
| rm pc = 10 h 20 | assign pc the value of 0 × 10, and h the value 0 × 20 |

The "rm" command can then be redefined by reading the following line of text into the Parse Table 44:

rm 19 6 0 2 10 3 1 24

This would have the effect of redefining the "rm" command to:

TABLE T-4

| Index | State | Description |
| --- | --- | --- |
| 1 | 0 | match the command name |
| 2 | 2 | match a hexadecimal value |
| 3 | 10 | match an optional ":" |
| 4 | 3 | match an optional "=" |
| 5 | 1 | match a register name |
| 6 | 24 | match the end-of-string |

Figure 5:
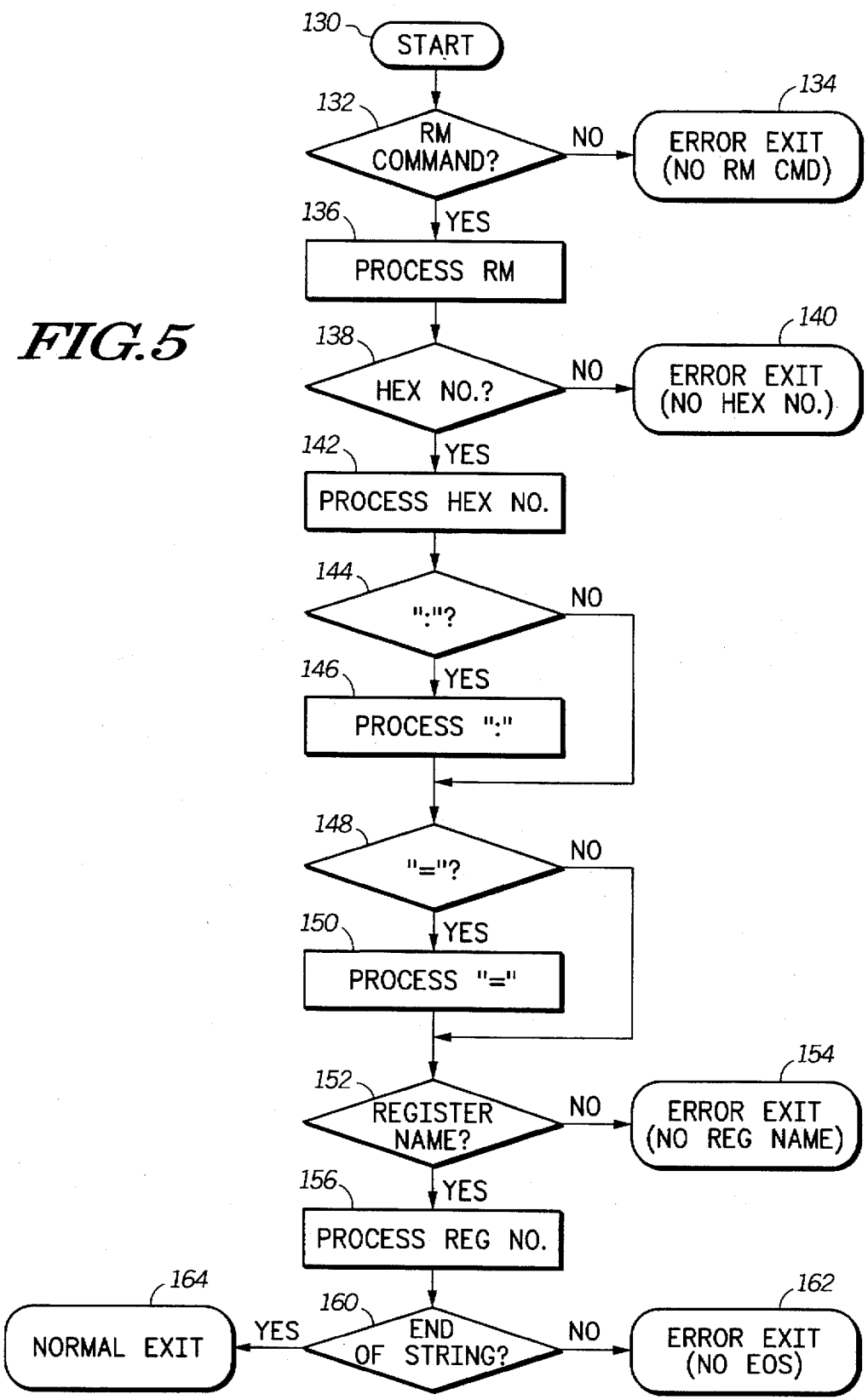
FIG. 5 is a flow chart showing showing in accordance with the current invention the logic of parsing the modified "rm" command in Table T-3.

FIG. 5 is a flow chart showing the logic of parsing the modified "rm" command in Table T-3. The parser enters the "rm" parse test in step 130. A check is made of the token stack for the "rm" command, step 132. If the command is not found as the first token, the parse error exits, step 134. Otherwise, the "rm" command is processed, step 136. The next token is checked as to whether it is a hex number, step 138. If there is no hex number, step 138, the parse error exits, step 140. Otherwise, the hex number is processed, step 142.

After the hex number is processed, step 142, a check is made of the tokens for an optional colon (":"), step 144. If the optional colon, step 144, is the next token, it is processed, step 146. In either case, a check is then made for an optional "=" in the stack of tokens, step 148. If the optional "=" is found, step 148, it is processed, step 150. In either case, a check is then made for a register name, step 152. If a register name is not the next token, step 152, the parse error exits, step 154. Otherwise, the register name is processed, step 156. Finally, a check is made for an end-of-string as the next token, step 160. If the end-of-string token is found, step 160, the parse exits normally, step 164. Otherwise, the parse error exits, step 162.

The modified definition of the "rm" command as shown in Table T-3 and FIG. 5 would thus allow commands of the format:

TABLE T-5

| Command | Meaning |
| --- | --- |
| rm 10 = pc | assign pc the value of 0 × 10 |
| rm 10 pc | assign pc the value of 0 × 10 |
| rm 10 : pc | assign pc the value of 0 × 10 |
| rm 10 : = pc | assign pc the value of 0 × 10 |

Allowing multiple registers could be easily added by appending 4, 23, and 2 to the end of the modified definition:

rm 19 9 0 2 10 3 1 24 4 23 2 resulting in the parse rules in Table T-6:

TABLE T-6

| Index | State | Description |
| --- | --- | --- |
| 1 | 0 | match the command name |
| 2 | 2 | match a hexadecimal value |
| 3 | 10 | match an optional ":" |
| 4 | 3 | match an optional "=" |
| 5 | 1 | match a register name |
| 6 | 24 | match the end-of-string |
| 7 | 4 | match an optional "," |
| 8 | 23 | jump |
| 9 | 2 | jump destination (index = 2) |

Dynamic Parsing, as disclosed herein, implements a flexible efficient method of quickly and easily modifying parse syntax rules "on the fly". It can be used in a command parser, an assembler, a disassembler, or a debugger. Dynamic Parsing can even be used in a database system. It is particularly useful when it is necessary to frequently modify syntax rules.

Those skilled in the art will recognize that modifications and variations can be made without departing from the spirit of the invention. Therefore, it is intended that this invention encompass all such variations and modifications as fall within the scope of the appended claims.

Appendix
-1- lex.h

```
/*************************************************************************/
/*                                                                       */
/* (C) Copyright Motorola 1993. All rights reserved.                     */
/*                                                                       */
/* This software is the property of Motorola, Inc. and is licensed to    */
/* the user for the sole purpose of providing an interface to the        */
/* Motorola MMDS05, MMDS08, or MMDS11 development systems. No othe*/
/* use of this software (or a portion thereof) is authorized. The        */
/* source code may not be distributed in any form to a third party       */
/* without the express written consent of the Motorola CSIC general      */
/* manager.                                                              */
/*                                                                       */
/* This notice must appear on all copies of this software.               */
/*                                                                       */
/* The transfer of this software does not constitute publication.        */
/*                                                                       */
/*************************************************************************/ short lex(void);
short lexCheckNumber(short *);

#define    INVALID      -1    /* this token is used to flag         */
                              /* an invalid character read in       */
#define    FALSE         0    /* the constant FALSE for 0           */
#define    TRUE          1    /* the constant TRUE for 1            */
#define    EOS           1    /* have we reached the end of         */
                              /* string we are analyzing ??         */
#define    NUM           2    /* read a number                      */
#define    STR           3    /* read a string                      */
#define    STAR          4    /* read a "*"                         */
#define    DOTDOT        5    /* read a ".."                        */
#define    COLON         6    /* read a ":"                         */
#define    SEMICOLON     7    /* read a ";"                         */
#define    POUND         8    /* read a "#"                         */
#define    DOT           9    /* read a "."                         */
#define    EQUAL        10    /* read a "="                         */
#define    COMMA        11    /* read a ","                         */
#define    BACKSLASH    12    /* read a "/"                         */
#define    PERCENT      13    /* read a % sign                      */
#define    DOLLAR       14    /* read a $ sign                      */
#define    AT           15    /* read the @ sign                    */
#define    AMPERSAND    16    /* read in a & sign                   */
#define    LBRACKET     17    /* read in a ( sign                   */
```

Appendix
-2- lex.h

```
     #define    RBRACKET    18    /* read in a ) sign                */
     #define    BIN         19    /* read in a binary number         */
     #define    OCT         20    /* read in a octal number          */
     #define    DEC         21    /* read in a decimal number        */
5    #define    HEX         22    /* read in a hexadecimal number    */
     #define    REG_TYPE    23    /* register type                   */
     #define    ASM_TYPE    24    /* assembler opcode                */
     #define    DASM_TYPE   25    /* disassembler opcode             */
     #define    CMD_TYPE    26    /* command name type               */
10
     /****************************************************************/
     /*                                                              */
     /* This definition list is continued in "cmd.h". So before you add */
     /* any more define's to this list for the lexical analyzer, please */
15   /* check to see you are not clobbering any definitions in "cmd.h"  */
     /*                                                              */
     /****************************************************************/
```

Appendix
-3- parse.h

```
/**********************************************************************/
/*                                                                    */
/* (C) Copyright Motorola, Inc. 1993-1995. All rights reserved.       */
/*                                                                    */
/* This software is the property of Motorola, Inc. and is licensed to */
/* the user for the sole purpose of providing an interface to the     */
/* Motorola MMDS05, MMDS08, or MMDS11 development systems. No other   */
/* use of this software (or a portion thereof) is authorized. The     */
/* source code may not be distributed in any form to a third party    */
/* without the express written consent of the Motorola CSIC general   */
/* manager.                                                           */
/*                                                                    */
/* This notice must appear on all copies of this software.            */
/*                                                                    */
/* The transfer of this software does not constitute publication.     */
/*                                                                    */
/**********************************************************************/ short       parse(char *);              /* function to parse   */
void        parseShowCmdHelp(int);      /* function to print   */
                                        /* help on a command   */
void        parseCmdName(void);         /*      state 0        */
void        parseRegName(void);         /*      state 1        */
void        parseNum(void);             /*      state 2        */
void        parseOptionalEqual(void);   /*      state 3        */
void        parseOptionalComma(void);   /*      state 4        */
void        parseString(void);          /*      state 5        */
void        parseFileName(void);        /*      state 6        */
void        parseOptionalNumber(void);  /*      state 7        */
void        parseBaudRate(void);        /*      state 8        */
void        parseOptionalDotDot(void);  /*      state 9        */
void        parseShutDown(void);        /*      state 22       */
void        parseJumpState(void);       /*      state 23       */
void        parseEndOfString(void);     /*      state 24       */
void        parseErrorState(void);      /*      state 25       */
void        parseNULL(void);            /*      NULL State     */ typedef void (*ptr)(void);

ptr     parseTable[] = { parseCmdName,      /*    state 0    */
                         parseRegName,      /*    state 1    */
                         parseNum,          /*    state 2    */
                         parseOptionalEqual,/*    state 3    */
                         parseOptionalComma,/*    state 4    */
                         parseString,       /*    state 5    */
                         parseFileName,     /*    state 6    */
                         parseOptionalNumber,/*   state 7    */
```

Appendix
-4- parse.h

```
parseBaudRate,          /*   state 8    */
parseOptionalDotDot,    /*   state 9    */
parseNULL,              /*   state 10   */
parseNULL,              /*   state 11   */
parseNULL,              /*   state 12   */
parseNULL,              /*   state 13   */
parseNULL,              /*   state 14   */
parseNULL,              /*   state 15   */
parseNULL,              /*   state 16   */
parseNULL,              /*   state 17   */
parseNULL,              /*   state 18   */
parseNULL,              /*   state 19   */
parseNULL,              /*   state 20   */
parseNULL,              /*   state 21   */
parseShutDown,          /*   state 22   */
parseJumpState,         /*   state 23   */
parseEndOfString,       /*   state 24   */
parseErrorState };   /* state 25       */
```

Appendix
-5- lex.c

```c
/************************************************************************/
/*                                                                      */
/* (C) Copyright Motorola 1993. All rights reserved                     */
/*                                                                      */
/* This software is the property of Motorola, Inc. and is licensed to   */
/* the user for the sole purpose of providing an interface to the       */
/* Motorola MMDS05, MMDS08, or MMDS11 development systems. No other*/
/* use of this software (or a portion thereof) is authorized. The       */
/* source code may not be distributed in any form to a third party      */
/* without the express written consent of the Motorola CSIC general     */
/* manager.                                                             */
/*                                                                      */
/* This notice must appear on all copies of this software               */
/*                                                                      */
/* The transfer of this software does not constitute publication.       */
/*                                                                      */
/************************************************************************/

/*-FH------------------------------------------------*/
/*              HEADER FILES                         */
/*-EH------------------------------------------------*/ include    "lex.h"
include    "symtab.h"
#include    "match.h"
#include    "cfcmd.h"

/*-FH------------------------------------------------*/
/*          GLOBAL EXTERNAL VARIABLES                */
/*-EH------------------------------------------------*/ extern      SYMTYPE     *symtab[];

extern      char        cmdStr[];

extern      int         cmdIndex;

extern      int         matchstate;

/*-FH------------------------------------------------*/
/*              GLOBAL VARIABLES                     */
/*-EH------------------------------------------------*/
```

Appendix
-6- lex.c

```
            /* the buffer in which lex returns a string to  */
            /* the parser                                   */ char      lexString[MAX_CMD_LENGTH];

/* the buffer in which lex returns a string to  */
            /* the parser                                   */ int       lexNumber;

/* the buffer in which lex returns a character */
            /* to the parser                                */ char      lexChar;
/*-FH--------------------------------------------------*/
/*                                                     */
/*    Function : lex                                   */
/*                                                     */
/*-EH--------------------------------------------------*/ short lex()
{
  int   status;
  short cmdIndexCtr = 0;

while ( cmdIndex < strlen ( cmdStr ) )
  {
    while ( cmdStr[cmdIndex] == ' ' && cmdIndex < strlen ( cmdStr ) )
       cmdIndex++;
    while ( cmdStr[cmdIndex] == '\t' && cmdIndex < strlen ( cmdStr ) )
       cmdIndex++;

cmdIndexCtr = 0;

switch ( cmdStr[cmdIndex] )
    {
      /*-----------------------------------------------*/
      /*                                               */
      /*    match single character tokens which might be on the command line */
```

Appendix
-7- lex.c

```
/*                                                              */
/*--------------------------------------------------------------*/ case '/' : cmdIndex = strlen ( cmdStr );
5                  return ( EOS );
                   break;

case '*' : cmdIndex++;
                   return ( STAR );
10                 break;

case '.' : cmdIndex++;
                   if ( cmdStr[cmdIndex] == '.' )
                       {
15                     cmdIndex++;
                       return ( DOTDOT );
                       }
                   else
                       {
20                     return ( DOT );
                       }
                   break;

case ';' : cmdIndex++;
25                 return ( SEMICOLON );
                   break;

case '(' : cmdIndex++;
                   return ( LBRACKET );
30                 break;

case ')' : cmdIndex++;
                   return ( RBRACKET );
                   break;
35
        case ':' : cmdIndex++;
                   return ( COLON );
                   break;

40      case '#' : cmdIndex++;
                   return ( POUND );
                   break;
```

Appendix
-8- lex.c

```
            case '=' : cmdIndex++;
                    return ( EQUAL );
                    break;

5           case ',' : cmdIndex++;
                    return ( COMMA );
                    break;

default :  break;
10          } switch ( cmdStr [ cmdIndex ] )
        {
          case '$' : cmdIndex++;
15                  status = matchHexNumber(&cmdIndexCtr);
                    if ( status == NUM )
                            {
                            return ( NUM );
                            }
20                  else
                            {
                            cmdIndex -= cmdIndexCtr;
                            return ( DOLLAR );
                            }
25                  break;

case '&' : cmdIndex++;
                    status = matchDecNumber(&cmdIndexCtr);
                    if ( status == NUM )
30                          {
                            return ( NUM );
                            }
                    else
                            {
35                          cmdIndex -= cmdIndexCtr;
                            return ( AMPERSAND );
                            }
                    break;

40        case '@' : cmdIndex++;
                    status = matchOctNumber(&cmdIndexCtr);
                    if ( status == NUM )
                            {
```

Appendix
-9- lex.c

```
                      return ( NUM );
                      }
              else
                      {
 5                    cmdIndex -= cmdIndexCtr;
                      return ( AT );
                      }
              break;

10      case '%' :cmdIndex++;
              status = matchBinNumber(&cmdIndexCtr);
              if ( status == NUM )
                      {
                      return ( NUM );
15                    }
              else
                      {
                      cmdIndex -= cmdIndexCtr;
                      return ( PERCENT );
20                    }
              break;

case '0' : cmdIndex++;
              if ( cmdStr [ cmdIndex ] == '\0' )
25                    {
                      return ( NUM );
                      }
              if ( cmdStr [ cmdIndex ] == 'x' || cmdStr [ cmdIndex ] == 'X' )
                      status = matchHexNumber(&cmdIndexCtr);
30            if ( cmdStr [ cmdIndex ] == 'l' || cmdStr [ cmdIndex ] == 'L' )
                      status = matchDecNumber(&cmdIndexCtr);
              if ( cmdStr [ cmdIndex ] == 'o' || cmdStr [ cmdIndex ] == 'O' )
                      status = matchOctNumber(&cmdIndexCtr);
              if ( cmdStr [ cmdIndex ] == 'y' || cmdStr [ cmdIndex ] == 'Y' )
35                    status = matchBinNumber(&cmdIndexCtr);
              if ( isdigit( cmdStr [ cmdIndex ] ) ||
                      ( cmdStr [ cmdIndex ] >= 'a' && cmdStr [ cmdIndex ] <= 'f' ) ||
                      ( cmdStr [ cmdIndex ] >= 'A' && cmdStr [ cmdIndex ] <= 'F' ) )
                      {
40                    cmdIndex--;
                      status = matchHexNumber(&cmdIndexCtr);
                      }
              if ( status == NUM )
```

Appendix
-10-

\*\* lex.c \*\*

```
                    {
                    return ( NUM );
                    }
            else
                    {
                    return ( INVALID );
                    }
            break;

default : break;
    } if ( matchstate != MATCH_CMD )
        {
        if ( isdigit ( cmdStr [ cmdIndex ] ) | |
            ( cmdStr [ cmdIndex ] >= 'a' && cmdStr [ cmdIndex ] <= 'f' ) | |
            ( cmdStr [ cmdIndex ] >= 'A' && cmdStr [ cmdIndex ] <= 'F' ) )
                {
                status = matchHexNumber(&cmdIndexCtr);
                if ( status == NUM )
                        {
                        return ( NUM );
                        }
                else
                        {
                        cmdIndex -= cmdIndexCtr;
                        }
                }
        }

/*----------------------------------------------------------------*/
/*   match a string value                                         */
/*----------------------------------------------------------------*/ if ( cmdIndex < strlen ( cmdStr ) && ( isalpha ( cmdStr[cmdIndex] ) | |
                                 isdigit ( cmdStr[cmdIndex] ) ) )
        {
        int  index = 0;

while ( ( isalpha ( cmdStr[cmdIndex] ) | | cmdStr[cmdIndex] == '.' | |
                  isdigit ( cmdStr[cmdIndex] ) ) && cmdIndex < strlen ( cmdStr ) )
                {
                if ( matchstate == MATCH_CMD )
```

Appendix
-11- lex.c

```
                lexString[index++] = toupper( cmdStr[cmdIndex++] );
        else
                lexString[index++] = cmdStr[cmdIndex++];
        }
        if (matchstate == MATCH_CMD)
                matchstate = MATCH_STR;
        lexString[index] = '\0';
        status = symtabLookup ( symtab, lexString );
        if (status == SYM_NFOUND)
                {
                return ( STR );
                }
        else
                {
                return ( status );
                }
        } cmdIndex++;
        return ( INVALID );
        } return ( EOS );

}
```

Appendix
-12- parse.c

```
/**********************************************************************/
/*                                                                    */
/* (C) Copyright Motorola 1993-1995. All rights reserved              */
/*                                                                    */
/* This software is the property of Motorola, Inc. and is licensed to */
/* the user for the sole purpose of providing an interface to the     */
/* Motorola MMDS05, MMDS08, or MMDS11 development systems.  No other  */
/* use of this software (or a portion thereof) is authorized.  The    */
/* source code may not be distributed in any form to a third party    */
/* without the express written consent of the Motorola CSIC general   */
/* manager.                                                           */
/*                                                                    */
/* This notice must appear on all copies of this software.            */
/*                                                                    */
/* The transfer of this software does not constitute publication.     */
/*                                                                    */
/**********************************************************************/

/*-FH----------------------------------------------------  */
/*              HEADER FILES                               */
/*-EH----------------------------------------------------  */ include    <stdio.h>
include    "lex.h"
#include    "cmd.h"
#include    "match.h"
#include    "parse.h"
#include    "symtab.h"

/*-FH----------------------------------------------------  */
/*           GLOBAL EXTERNAL VARIABLES                     */
/*-EH----------------------------------------------------  */ extern      char   lexString[];

extern      int    lexNumber;

extern      char   cmdStr[];

/*-FH----------------------------------------------------  */
/*              GLOBAL VARIABLES                           */
/*-EH----------------------------------------------------  */
```

Appendix
-13- parse.c

```
                        /* index into the array that holds the command      */
                        /* string to be parsed. Lex uses this to             */
                        /* maintain a pointer to the token it needs to       */
                        /* parse next.                                       */
        int         cmdIndex = 0;

/* The array that holds the command string           */
                        /* currently being parsed                            */
        char        cmdStr[256];

/* the state table for the command currently         */
                        /* being parsed                                      */
        int     cmdState[MAX_CMD_STATE];

/* the state we are currently in                     */
        int         cmdStateNum;

int         currStateNum = 0;

int         currLexState = 0;

int         matchstate = MATCH_CMD;

/*-FH----------------------------------------------------------*/
/*                                                             */
/*   Function : parse                                          */
/*                                                             */
/*-EH----------------------------------------------------------*/ short parse(char *command)
{
  int i;

strcpy(cmdStr, command);
  cmdIndex = 0;
  matchstate = MATCH_CMD;
  currStateNum = 0;
  (parseTable[currStateNum])();
```

Appendix
-14- parse.c

```
    }

/*-FH--------------------------------------------------   */
    /*                                                        */
5   /*   Function : parseCmdName                              */
    /*                                                        */
    /*-EH--------------------------------------------------   */ void parseCmdName()
10  { currLexState = lex();
      if ( currLexState == CMD_TYPE )
      {
15      matchstate = MATCH_STR;
        currStateNum++;
        currLexState = lex();
        (parseTable[cmdState[currStateNum]])();
      }
20    else
      {
        parseErrorState();
      }

25  }

/*-FH--------------------------------------------------   */
    /*                                                        */
    /*   Function : parseRegName                              */
30  /*                                                        */
    /*-EH--------------------------------------------------   */ void parseRegName()
    {
35
      if ( currLexState == REG_TYPE )
      {
        currStateNum++;
40      currLexState = lex();
        (parseTable[cmdState[currStateNum]])();
      }
      else
```

Appendix
-15- parse.c

```
   {
     parseErrorState();
   }
 }

/*-FH--------------------------------------------------  */
 /*                                                       */
 /*   Function : parseNum                                 */
 /*                                                       */
 /*-EH--------------------------------------------------  */ void parseNum()
 { if ( currLexState == NUM )
   {
    currLexState = lex();
    currStateNum++;
    (parseTable[cmdState[currStateNum]])();
   }
   else
   {
    parseErrorState();
   }

}

/*-FH--------------------------------------------------  */
 /*                                                       */
 /*   Function : parseOptionalEqual                       */
 /*                                                       */
 /*-EH--------------------------------------------------  */ void parseOptionalEqual()
 { if ( currLexState == EQUAL )
   {
    currLexState = lex();
    currStateNum++;
```

Appendix
-16- parse.c

```
      (parseTable[cmdState[currStateNum]])();
    }
    else
    {
      currStateNum++;
      (parseTable[cmdState[currStateNum]])();
    }

}

/*-FH------------------------------------------------ */
/*                                                    */
/*    Function : parseOptionalComma                   */
/*                                                    */
/*-EH------------------------------------------------ */ void parseOptionalComma()
  { if ( currLexState == COMMA )
    {
      currLexState = lex();
      currStateNum++;
      (parseTable[cmdState[currStateNum]])();
    }
    else
    {
      currStateNum++;
      (parseTable[cmdState[currStateNum]])();
    }

}

/*-FH------------------------------------------------ */
/*                                                    */
/*    Function : parseString                          */
/*                                                    */
/*-EH------------------------------------------------ */
  void parseString()
  {
```

Appendix
-17- parse.c

```
      if ( currLexState == STR )
      {
       currLexState = lex();
       currStateNum++;
       (parseTable[cmdState[currStateNum]])();
      }
      else
      {
       parseErrorState();
      }

}

/*-FH----------------------------------------------          */
/*                                                           */
/*    Function : parseFileName                               */
/*                                                           */
/*-EH----------------------------------------------          */
   void parseFileName()
   { if ( currLexState == STR )
      {
       currLexState = lex();
       currStateNum++;
       (parseTable[cmdState[currStateNum]])();
      }
      else
      {
       parseErrorState();
      }

}

/*-FH----------------------------------------------          */
/*                                                           */
/*    Function : parseOptionalNum                            */
/*                                                           */
/*-EH----------------------------------------------          */
```

Appendix
-18- parse.c

```
    void parseOptionalNumber()
    {

5     if ( currLexState == NUM )
      {
        currLexState = lex();
        currStateNum++;
        (parseTable[cmdState[currStateNum]])();
10    }
      else
      {
        currStateNum++;
        (parseTable[cmdState[currStateNum]])();
15    }

}

/*-FH--------------------------------------------------  */
20  /*                                                       */
    /*   Function : parseBaudRate                            */
    /*                                                       */
    /*-EH--------------------------------------------------  */

25  void parseBaudRate()
    { if ( currLexState == NUM )
30    {
        currLexState = lex();
        currStateNum++;
        (parseTable[cmdState[currStateNum]])();
      }
35    else
      {
        parseErrorState();
      }

40  }

/*-FH--------------------------------------------------  */
    /*                                                       */
```

Appendix
-19- parse.c

```
/* Function : parseOptionalDotDot              */
/*                                             */
/*-EH------------------------------------------*/ void parseOptionalDotDot()
{ if ( currLexState == DOTDOT )
   {
     currLexState = lex();
     currStateNum++;
     (parseTable[cmdState[currStateNum]])();
   }
   else
   {
     currStateNum++;
     (parseTable[cmdState[currStateNum]])();
   }

}

/*-FH------------------------------------------*/
/*                                             */
/* Function : parseShutDown                    */
/*                                             */
/*-EH------------------------------------------*/ void parseShutDown()
{ guikrnlShutdownKernel();
   exit(0);

}

/*-FH------------------------------------------*/
/*                                             */
/* Function : parseJumpState                   */
/*                                             */
/*-EH------------------------------------------*/
```

Appendix
-20- parse.c

```c
void parseJumpState()
{

/* and then jump to the next state in the state array       */
}

/*-FH--------------------------------------------------------   */
/*                                                              */
/*   Function : parseEndOfString                                */
/*                                                              */
/*-EH--------------------------------------------------------   */ void parseEndOfString()
{ while ((currLexState = lex()) != EOS)
        ;

}

/*-FH--------------------------------------------------------   */
/*                                                              */
/*   Function : parseErrorState                                 */
/*                                                              */
/*-EH--------------------------------------------------------   */ void parseErrorState()
{ if ( cmdState != NULL )
    {
      parseShowCmdHelp(cmdState[currStateNum]);
    }
    else
    {
      parseShowCmdHelp(currStateNum);
    }

}

/*-FH--------------------------------------------------------   */
/*                                                              */
```

Appendix
-21- parse.c

```
/*   Function : parseNULL                                          */
/*                                                                 */
/*-EH------------------------------------------------------------- */

5   void parseNULL()
    { parseErrorState();

10  }

/*-FH------------------------------------------------------------ */
    /*                                                                */
    /*   Function : parseShowCmdHelp                                  */
15  /*                                                                */
    /*-EH------------------------------------------------------------ */ void parseShowCmdHelp(int stateNum)
    {
20
        char cmdHelpStr[MAXCMDLEN];

switch ( stateNum )
        {
25      case 0 : sprintf(cmdHelpStr, "Error. Illegal Command Name %s\n", lexString );
            break;
        case 1 : sprintf(cmdHelpStr, "Error. Illegal Register Name %s\n", lexString );
            break;
        case 2 : sprintf(cmdHelpStr, "Error. Illegal Numeric Value %d\n", lexNumber );
30          break;
        case 3 : sprintf(cmdHelpStr, "Error. Optional Comma\n");       /* useless state */
            break;
        case 4 : sprintf(cmdHelpStr, "Error. Optional Equal\n");       /* useless state */
            break;
35      case 5 : sprintf(cmdHelpStr, "Error. Illegal String Entered %s\n", lexString );
            break;
        case 6 : sprintf(cmdHelpStr, "Error. Illegal Filename %s\n", lexString );
            break;
        default : break;
40      } guikrnlTextOut( cmdHelpStr );
        fflush(stdout);
```

Appendix
-22- parse.c

}

We claim:

1. A method for dynamically reconfiguring the parsing of data by a parser, said method comprising the step of:
- a) reading one or more Parse Control Records into a corresponding one of a plurality of Parse Table Entries in a Parse Table in a Memory, wherein:
    each of the one or more Parse Control Records includes a Parse Table Entry Identifier,
    each of the Parse Control Records and each of the Parse Table Entries identifies a corresponding command, and
    each of the Parse Control Records and each of the Parse Table Entries comprises an ordered sequence of allowable parse states for the corresponding command,
    said step further comprising the substeps of:
    1) identifying which one of the Parse Table Entries corresponds to each of the one or more Parse Control Records utilizing the Parse Table Entry Identifier in the Parse Control Records.

2. A method for parsing text utilizing the method in claim 1 which further comprises the steps of:
- b) reading a Text String to be parsed;
- c) tokenizing the Text String into an Ordered Sequence of Tokens;
- d) selecting one of the plurality of Parse Table Entries as a Selected Parse Table Entry; and
- e) evaluating the Ordered Sequence of Tokens pursuant to the allowable parse states in the Selected Parse Table Entry to determine whether the Text String has a valid syntax.

3. The method in claim 2 which further comprises:
- f) repeating steps (d)–(e), selecting a different Parse Table Entry each time until either:
    1) the Text String is evaluted to have valid syntax, or
    2) all of the Parse Table Entries in the Parse Table have been selected and evaluated.

4. The method in claim 3 which further comprises:
- g) repeating steps (c)–(f) until no more Text Strings can be read.

5. A method for assembling a plurality of lines of assembler code which utilizes the method in claim 2 to parse the plurality of lines of assembler code.

6. An apparatus for debugging and testing a Computer Processor that utilizes the method in claim 2 to parse assembler code, wherein:
the apparatus determines the identity of the Computer Processor to be tested, and
assembler instruction codes are loaded into the Parse Table in response to the determination of the identity of the Computer Processor.

7. The method in claim 1 wherein in step (a):
each said Parse Table Entry Identifier is an index into the Parse Table.

8. The method in claim 1 wherein:
Parse Control Records are added by a user while a target application is running, causing the parser to change the syntax it will accept.

9. The method in claim 1 wherein:
Parse Control Records are modified by a user while a target application is running, causing the parser to change the syntax it will accept.

10. A method for parsing text with a dynamically reconfigurable parser, said method comprising the step of:
- a) reading one or more Parse Control Records into a corresponding one of a plurality of Parse Table Entries in a Parse Table in a Memory, wherein:
    each of the one or more Parse Control Records includes a Parse Table Entry Identifier,
    each of the Parse Control Records and each of the Parse Table Entries identifies a corresponding command,
    each of the Parse Control Records and each of the Parse Table Entries comprises an ordered sequence of allowable parse states for the corresponding command, and
    each said Parse Table Entry Identifier is an index into the Parse Table;
    said step further comprising the substeps of:
    1) identifying which one of the Parse Table Entries corresponds to each of the one or more Parse Control Records utilizing the Parse Table Entry Identifier in the Parse Control Records;
- b) reading a Text String to be parsed;
- c) tokenizing the Text String into an Ordered Sequence of Tokens;
- d) selecting one of the plurality of Parse Table Entries as a Selected Parse Table Entry; and
- e) evaluating the Ordered Sequence of Tokens pursuant to the allowable parse states in the Selected Parse Table Entry to determine whether the Text String has a valid syntax;
- f) repeating steps (d)–(e), selecting a different Parse Table Entry each time until either:
    1) the Text String is evaluated to have valid syntax, or
    2) all of the Parse Table Entries in the Parse Table have been selected and evaluated; and
- g) repeating steps (c)–(f) until no more Text Strings can be read.

11. A dynamically reconfigurable parser for parsing text comprising:
- a) means for reading one or more Parse Control Records into a corresponding one of a plurality of Parse Table Entries in a Parse Table in a Memory, wherein:
    each of the one or more Parse Control Records includes a Parse Table Entry Identifier,
    each of the Parse Control Records and each of the Parse Table Entries identifies a corresponding command, and
    each of the Parse Control Records and each of the Parse Table Entries comprises an ordered sequence of allowable parse states for the corresponding command,
    said element (a) further comprising the subelement of:
    1) means for identifying which one of the Parse Table Entries corresponds to each of the one or more Parse Control Records utilizing the Parse Table Entry Identifier in the Parse Control Records.

12. The dynamically configurable parser claimed in claim 11 which further comprises:
- b) means for reading a Text String to be parsed;
- c) means for tokenizing the Text String into an Ordered Sequence of Tokens;
- d) means for selecting one of the plurality of Parse Table Entries as a Selected Parse Table Entry; and
- e) means for evaluating the Ordered Sequence of Tokens pursuant to the allowable parse states in the Selected Parse Table Entry to determine whether the Text String has a valid syntax.

13. The dynamically reconfigurable parser claimed in claim 12 which further comprises:
   f) means for repeating elements (d)–(e), selecting a different Parse Table Entry each time until either:
      1) the Text String is evaluted to have valid syntax, or
      2) all of the Parse Table Entries in the Parse Table have been selected and evaluated.

14. The dynamically reconfigurable parser claimed in claim 13 which further comprises:
   g) means for repeating elements (c)–(f) until no more Text Strings can be read.

15. An apparatus for assembling a plurality of lines of assembler code which utilizes the dynamically reconfigurable parser claimed in claim 12 to parse the plurality of lines of assembler code.

16. An apparatus for debugging and testing a Computer Processor that utilizes the dynamically reconfigurable parser claimed in claim 12 to parse assembler code, wherein:
   the apparatus determines the identity of the Computer Processor to be tested, and
   assembler instruction codes are loaded into the Parse Table in response to the determination of the identity of the Computer Processor.

17. The dynamically reconfigurable parser claimed in claim 11 wherein in element (a):
   each said Parse Table Entry Identifier is an index into the Parse Table.

18. The dynamically reconfigurable parser claimed in claim 11 wherein:
   Parse Control Records are added by a user while a target application is running, causing the parser to change to change the syntax it will accept.

19. The dynamically reconfigurable parser claimed in claim 11 wherein:
   Parse Control Records are modified by a user while a target application is running, causing the parser to change the syntax it will accept.

20. A dynamically reconfigurable parser for parsing text, said apparatus comprising:
   a) means for reading one or more Parse Control Records into a corresponding one of a plurality of Parse Table Entries in a Parse Table in a Memory, wherein:
      each of the one or more Parse Control Records includes a Parse Table Entry Identifier,
      each of the Parse Control Records and each of the Parse Table Entries identifies a corresponding command,
      each of the Parse Control Records and each of the Parse Table Entries comprises an ordered sequence of allowable parse states for the corresponding command, and
      each said Parse Table Entry Identifier is an index into the Parse Table;
      said element further comprising the subelement of:
         1) means for identifying which one of the Parse Table Entries corresponds to each of the one or more Parse Control Records utilizing the Parse Table Entry Identifier in the Parse Control Records;
   b) means for reading a Text String to be parsed;
   c) means for tokenizing the Text String into an Ordered Sequence of Tokens;
   d) means for selecting one of the plurality of Parse Table Entries as a Selected Parse Table Entry;
   e) means for evaluating the Ordered Sequence of Tokens pursuant to the allowable parse states in the Selected Parse Table Entry to determine whether the Text String has a valid syntax;
   f) means for repeatedly invoking elements (d)–(e), selecting a different Parse Table Entry each time until either:
      1) the Text String is evaluted to have valid syntax, or
      2) all of the Parse Table Entries in the Parse Table have been selected and evaluated; and
   g) means for repeatedly invoking elements (c)–(f) until no more Text Strings can be read.

21. A dynamically reconfigurable parser for parsing text, comprising:
   a) a Memory; and
   b) a computer processor connected to the Memory that is programmed to read one or more Parse Control Records into a corresponding one of a plurality of Parse Table Entries in a Parse Table in the Memory, wherein:
      each of the one or more Parse Control Records includes a Parse Table Entry Identifier,
      each of the Parse Control Records and each of the Parse Table Entries identifies a corresponding command, and
      each of the Parse Control Records and each of the Parse Table Entries comprises an ordered sequence of allowable parse states for the corresponding command, said element (b) further comprising the subelement of:
         1) means for identifying which one of the Parse Table Entries corresponds to each of the one or more Parse Control Records utilizing the Parse Table Entry Identifier in the Parse Control Records.

22. The dynamically reconfigurable parser claimed in claim 21 which further comprises:
   c) the computer processor programmed to read a Text String to be parsed;
   d) the computer processor programmed to tokenize the Text String into an Ordered Sequence of Tokens;
   e) the computer processor programmed to select one of the plurality of Parse Table Entries as a Selected Parse Table Entry; and
   f) the computer processor programmed to evaluate the Ordered Sequence of Tokens pursuant to the allowable parse states in the Selected Parse Table Entry to determine whether the Text String has a valid syntax.

* * * * *